United States Patent
Nagao et al.

(10) Patent No.: US 9,533,290 B2
(45) Date of Patent: Jan. 3, 2017

(54) EXHAUST GAS PURIFYING CATALYST COMPOSITION AND EXHAUST GAS PURIFYING CATALYST

(71) Applicant: Mitsui Mining & Smelting Co., Ltd., Tokyo (JP)

(72) Inventors: Yuki Nagao, Ageo (JP); Makoto Ogawa, Ageo (JP); Ryoichi Oshima, Ageo (JP); Ohki Houshito, Ageo (JP); Yunosuke Nakahara, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 234 days.

(21) Appl. No.: 14/255,127

(22) Filed: Apr. 17, 2014

(65) Prior Publication Data

US 2014/0323294 A1  Oct. 30, 2014

(30) Foreign Application Priority Data

Apr. 18, 2013  (JP) .................. 2013-087506

(51) Int. Cl.

| | |
|---|---|
| *B01J 23/89* | (2006.01) |
| *B01J 23/889* | (2006.01) |
| *B01D 53/94* | (2006.01) |
| *B01J 23/34* | (2006.01) |
| *B01J 23/83* | (2006.01) |
| *B01J 23/86* | (2006.01) |
| *B01J 35/00* | (2006.01) |
| *B01J 23/52* | (2006.01) |
| *B01J 23/10* | (2006.01) |
| *B01J 23/755* | (2006.01) |
| *B01J 23/745* | (2006.01) |
| *B01J 23/72* | (2006.01) |
| *B01J 23/75* | (2006.01) |
| *F01N 3/10* | (2006.01) |
| *B01J 37/02* | (2006.01) |
| *B01J 23/26* | (2006.01) |
| *B01J 23/50* | (2006.01) |
| *B01J 35/10* | (2006.01) |

(52) U.S. Cl.
CPC .......... *B01J 23/8986* (2013.01); *B01D 53/944* (2013.01); *B01J 23/34* (2013.01); *B01J 23/83* (2013.01); *B01J 23/868* (2013.01); *B01J 23/8892* (2013.01); *B01J 35/002* (2013.01); *B01D 2255/2073* (2013.01); *B01D 2255/20761* (2013.01); *B01D 2255/407* (2013.01); *B01D 2255/65* (2013.01); *B01J 23/10* (2013.01); *B01J 23/26* (2013.01); *B01J 23/50* (2013.01); *B01J 23/52* (2013.01); *B01J 23/72* (2013.01); *B01J 23/745* (2013.01); *B01J 23/75* (2013.01); *B01J 23/755* (2013.01); *B01J 23/894* (2013.01); *B01J 23/8946* (2013.01); *B01J 23/8993* (2013.01); *B01J 35/1014* (2013.01); *B01J 37/0234* (2013.01); *B01J 2523/00* (2013.01); *F01N 3/103* (2013.01)

(58) Field of Classification Search
CPC ............ B01J 23/10; B01J 23/26; B01J 23/34; B01J 23/50; B01J 23/52; B01J 23/72; B01J 23/745; B01J 23/75; B01J 23/755
USPC ....... 502/304, 319, 331, 337, 338, 345, 347; 423/263
See application file for complete search history.

(56) References Cited

U.S. PATENT DOCUMENTS

| | | | |
|---|---|---|---|
| 2004/0188238 A1* | 9/2004 | Hemingway | F01N 13/009 204/164 |
| 2008/0009410 A1* | 1/2008 | Okamoto | B01D 53/945 502/304 |

FOREIGN PATENT DOCUMENTS

| | | |
|---|---|---|
| JP | 10-151348 | 6/1998 |
| JP | 2000-319019 A | 11/2000 |
| JP | 2008-013423 A | 1/2008 |
| JP | 2008-018322 A | 1/2008 |
| JP | 2011-041912 A | 3/2011 |
| JP | 2011-219329 A | 4/2011 |
| JP | 2012-239982 | 12/2012 |
| JP | 2012-245452 | 12/2012 |
| JP | 2013-027858 | 2/2013 |
| JP | 2014-518191 A | 7/2014 |
| WO | 2013/004534 A1 | 1/2013 |
| WO | 2014/076999 A1 | 5/2014 |

OTHER PUBLICATIONS

Hutchings et al., Effect of preparation conditions on the catalytic performance of copper manganese oxide catalysts for CO oxidation, 1998, Applied Catalysis A: General, 166, 143-152.*

* cited by examiner

*Primary Examiner* — Matthew E Hoban
*Assistant Examiner* — James Fiorito
(74) *Attorney, Agent, or Firm* — The Webb Law Firm

(57) ABSTRACT

Provided is a catalyst composition using other metals different from noble metals as a catalytic activity component and which has an excellent catalytic activity even after a thermal duration treatment. Provided are an exhaust gas purifying catalyst composition which includes ceria-zirconia particles with a feature in that a peak arising from (111) plane is divided into two peak tops in an XRD pattern and in which a transition metal including at least one of Cu, Cr, Fe, Mn, Co, Ni, and Ag is supported on the ceria-zirconia particles, and a catalyst using the exhaust gas purifying catalyst composition.

10 Claims, 1 Drawing Sheet

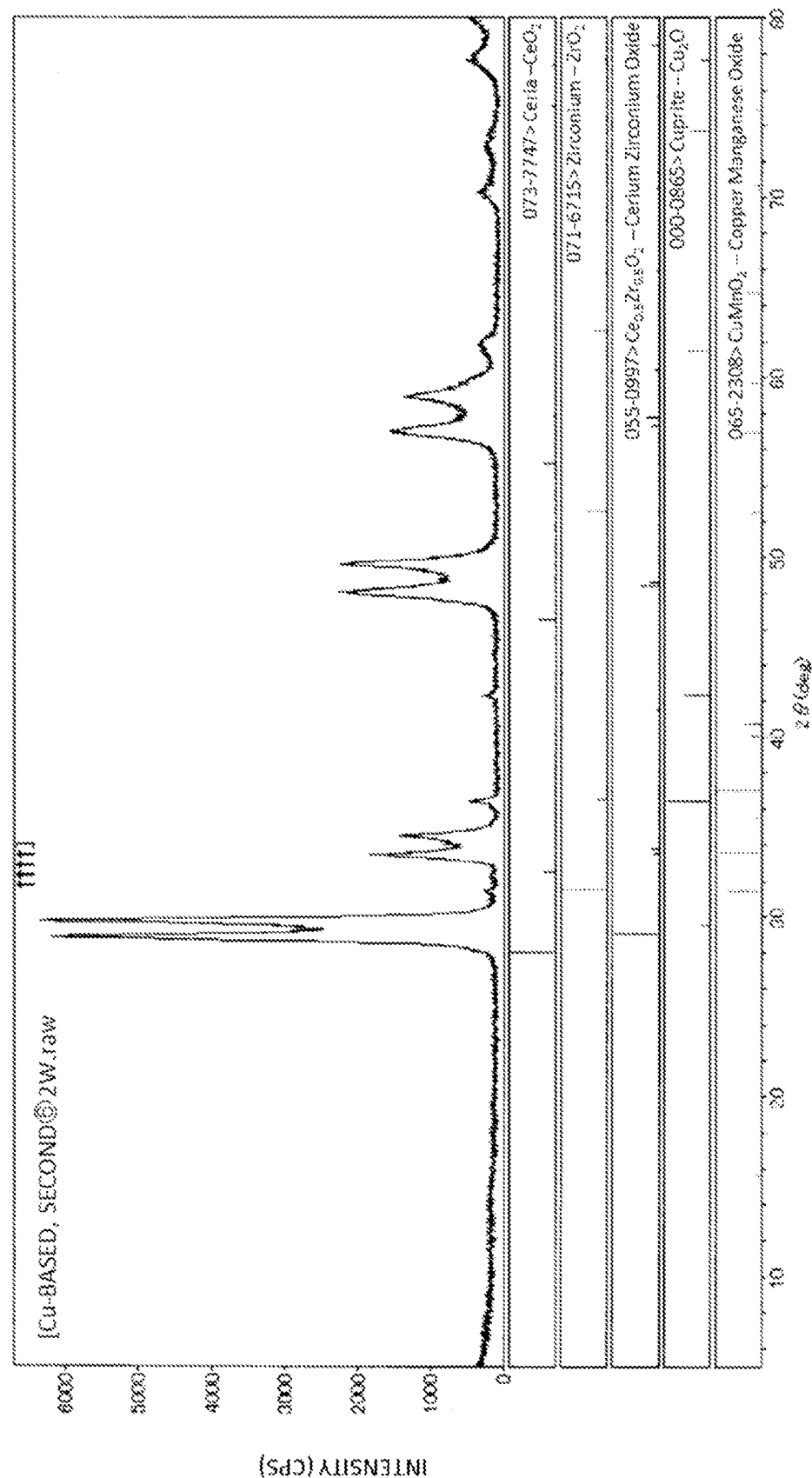

EXHAUST GAS PURIFYING CATALYST COMPOSITION AND EXHAUST GAS PURIFYING CATALYST

CROSS-REFERENCE TO RELATED APPLICATION

This application claims priority to Japanese Patent Application No. 2013-087506 filed Apr. 18, 2013, the disclosure of which is hereby incorporated in its entirety by reference.

TECHNICAL FIELD

The present invention relates to a catalyst which can be used for purifying an exhaust gas to be emitted from an internal-combustion engine such as a gasoline engine and a diesel engine of two-wheel or four-wheel automobiles or the like and a catalyst composition used in the catalyst.

BACKGROUND ART

An exhaust gas of automobiles which use gasoline for fuel contains hazardous components such as hydrocarbon (THC), carbon monoxide (CO), and nitrogen oxide (NOx). Therefore, it is necessary to purify each of the hazardous components in such a manner that the hydrocarbon (THC) is converted into water and carbon dioxide by oxidation; the carbon monoxide (CO) is converted into the carbon dioxide by oxidation; and the nitrogen oxide (NOx) is converted into nitrogen by reduction.

As a catalyst (hereinafter, referred to as an "exhaust gas purifying catalyst") adapted to treat these exhaust gases, three way catalysts (TWC) capable of oxidizing and reducing CO, THC, and NOx have been used.

Three way catalysts are well known, in which a noble metal is supported on a refractory oxide porous body having a high-specific surface area, for example, an alumina porous body having a high-specific surface area and the noble metal is supported on a substrate, for example, a monolithic substrate made of a refractory ceramic or metallic honeycomb structure, or on refractory particles.

On the other hand, the exhaust gas discharged from the diesel engine contains sulfate salts based on sulfur content in a fuel, tar-like particulate matters (referred to as "PM") derived from incomplete combustion, nitrogen oxide (NOx) or the like.

As an apparatus for removing the PM contained in the exhaust gas discharged from the diesel engine, an exhaust gas purification apparatus, which collects the PM in a diesel particulate filter (referred to as a "DPF") and burns the collected PM at an appropriate timing to remove, has been well known.

Usually, this DPF is configured such that a porous filter substrate with a honeycomb structure forms a skeleton to collect the PM in a surface of a partition wall of the substrate when the exhaust gas flows inside the partition wall.

In both of a catalyst for purifying the exhaust gas discharged from the gasoline engine and a catalyst for purifying the exhaust gas discharged from the diesel engine, conventionally, expensive noble metals such as platinum (Pt) or rhodium (Rh) have been used as a catalytic activity component in many cases. However, these noble metals are very expensive due to a small amount of reserves and suffer sharp fluctuations in price depending on changes in demand. Therefore, a catalyst containing transition metals, and alumina powder or ceria-zirconia powder has been proposed in the related arts, as a catalyst in which the expensive noble metals are not used or noble metal usage is reduced using other metals different from the noble metals.

For example, Patent Document 1 proposes a catalyst containing a catalyst component consisting of a carrier formed of a ceria-zirconia solid solution and an oxide of at least one metal selected from Cu, Fe, and Mn which is supported on the carrier, as a catalyst capable of improving DPF combustion efficiency.

Patent Document 2 proposes a catalyst in which Cu, Fe, Co, or Ni is supported on a ceria-zirconia solid solution having a pyrochlore structure.

Patent Document 3 proposes a catalyst in which particles consisting of copper or copper oxide are supported on a ceria•zirconia carrier and a ratio between Ce and Zr (Ce/Zr, mass ratio) in a surface of the carrier is in a range of 0.5<Ce/Zr<2.5, as a catalyst capable of improving purification performance of NOx.

Patent Document 4 proposes an exhaust gas purifying catalyst containing a spinel-type composite metal oxide, which is represented by $AB_2O_4$, and at least one selected from $Al_2O_3$, $ZrO_2$, $TiO_2$, and $SiO_2$.

CITATION LIST

Patent Document

Patent Document 1: JP 10-151348 A

Patent Document 2: JP 2012-239982 A

Patent Document 3: JP 2012-245452 A

Patent Document 4: JP 2013-27858 A

In a catalyst in which $Al_2O_3$ or a ceria-zirconia powder, among conventional catalyst compositions using other metals different from noble metals as a catalytic activity component, is used as a catalyst carrier, there is a problem in that a catalytic activity is significantly reduced since the catalytic activity component exists in a carrier and the like as a solid solution or is sintered by a thermal duration treatment.

SUMMARY OF THE INVENTION

Therefore, the invention relates to a catalyst composition in which other metals different from the noble metals are used as a catalytic activity component and the ceria-zirconia powder is used as the catalyst carrier, and is to propose a new exhaust gas purifying catalyst composition and a catalyst using the same, which have an excellent catalytic activity even after a thermal duration treatment.

The invention provides an exhaust gas purifying catalyst composition which includes ceria-zirconia particles with a feature in that a peak arising from (111) plane is divided into two peak tops in an XRD pattern and in which a transition metal including at least one of Cu, Cr, Fe, Mn, Co, Ni, and Ag is supported on the ceria-zirconia particles.

The exhaust gas purifying catalyst composition and the catalyst using the same according to the invention can be more inexpensively provided, since the noble metals cannot be used or noble metal usage can be significantly reduced. Furthermore, the catalytic activity after the thermal duration treatment, in particular, oxidation activity of HC and CO is also excellent.

BRIEF DESCRIPTION OF THE DRAWING

The drawing is a diagram illustrating an XRD pattern of ceria-zirconia particles in a catalyst obtained by Example 1.

DESCRIPTION OF THE INVENTION

Next, embodiments of the invention will be described. However, the invention is not intended to be limited to the embodiments described below.

<Present Catalyst Composition>

An exhaust gas purifying catalyst composition (referred to as a "present catalyst composition") according to an embodiment contains ceria-zirconia particles and is a composition containing catalyst particles (referred to as "present catalyst particles") in which a transition metal including at least one of Cu, Cr, Fe, Mn, Co, Ni, and Ag is supported on the ceria-zirconia particles (also referred to as a "ceria-zirconia carrier").

(Present Catalyst Particles)

As described above, the present catalyst particles are catalyst particles in which a predetermined transition metal is supported on the ceria-zirconia particles.

(Ceria-Zirconia Particles)

The ceria-zirconia particles are particles consisting of a ceria-zirconia solid solution having a strong interaction with an activity component. The ceria-zirconia particles constituting the present catalyst particles have a feature in that a peak ($2\theta$=around 28 to 32°) arising from (111) plane is divided into two peak tops in the XRD pattern, and it is presumed that there is not a uniform solid solution of the ceria and zirconia which uniformly exists as a solid solution but a ceria-zirconia separation solid solution which is partially separated and exists as a solid solution so that the peak tops are divided into two.

A ceria-zirconia separation solid solution powder having such feature can be obtained by supporting the transition metal acting as a catalytic activity on a ceria-zirconia powder and then firing the transition metal supported on a ceria-zirconia powder at a high temperature of preferably 900° C. or higher under an air atmosphere. This atmosphere may be an inert gas atmosphere such as nitrogen, an oxidizing atmosphere, or a reducing atmosphere. Preferably, the transition metal is more finely dispersed and is supported in a wet type.

The ceria-zirconia particles may contain other rare earth elements (La, Pr, or Nd) of 0.01 wt % or more and 50 wt % or less, and preferably 1 wt % or more and 10 wt % or less, for the purpose of enhancing heat resistance.

Furthermore, it has been confirmed that the deterioration of the catalytic activity cannot be restrained after a thermal duration treatment, even when the transition metal is supported on an inorganic porous body, for example, ceria particles, zirconia particles, or alumina particles other than the ceria-zirconia particles.

In the ceria-zirconia particles, a content rate (ceria:zirconia) of ceria to zirconia is preferably 5:95 to 95:5, more preferably 10:90 to 90:10, and most preferably 20:80 to 80:20.

Preferably, the ceria-zirconia particles are contained in the present catalyst composition at a rate of 5 to 99 mass %. CO and THC can be sufficiently purified under a fuel-rich atmosphere when the ceria-zirconia particles are contained in the present catalyst composition at a rate of 5 mass % or more, and adhesion with a substrate can be reliably secured when the content of the ceria-zirconia particles is 99 mass % or less.

From such a viewpoint, the ceria-zirconia particles are preferably contained in the present catalyst composition at a rate of 5 to 99 mass % and particularly preferably at a rate of 10 mass % or more or 90 mass % or less.

(Catalytic Activity Component)

The present catalyst particles are contained in a state where the transition metal including at least one of Cu, Cr, Fe, Mn, Co, Ni, and Ag is supported on the ceria-zirconia particles, as a catalytic activity component.

Examples of the transition metal may include at least one of Cu, Cr, Fe, Mn, Co, Ni, and Ag. Moreover, the transition metal may consist of one or a combination of two or more of these elements.

Among these examples, the transition metal (transition metal, which combines with Cu, is referred to as "transition metal A") consisting of a combination of Cu and one or two or more of Cr, Mn, Co, and Ni is preferred in view of the fact that a melting point is relatively high. Particularly, a combination of Cu and the transition metal A including Cr or a combination of Cu and the transition metal A including Mn is more preferred.

At this time, Cu and the transition metal A are supported on the ceria-zirconia particles in a state of each oxide or in a state of composite oxide of them.

Before the thermal duration treatment, for example, in a state (Fresh) before the thermal duration treatment for heating to 400° C. or higher, Cu and the transition metal A are supported on the ceria-zirconia particles in the state of each oxide.

On the other hand, after the thermal duration treatment, for example, in a state (Aged) after the thermal duration treatment for heating to 800° C. or higher, Cu and the transition metal A are supported on the ceria-zirconia particles in the state of each oxide, or in a state of composite oxide of them.

At this time, when the thermal duration treatment is carried out by heating, for example, in a case where the transition metal A is Fe or Mn, Cu and the transition metal A are turned into a state of a delafossite-type oxide and are supported on the ceria-zirconia particles. In addition, the atmosphere of heating may be any atmosphere of the reducing atmosphere, the oxidizing atmosphere, or the inert atmosphere (for example, nitrogen atmosphere).

Further, the delafossite-type oxide can be confirmed by identifying peaks through an X-ray diffraction analysis (XRD). For example, in a case where the transition metal A is Fe or Mn, the transition metal A is turned into the delafossite-type oxide by heating at 800° C. for 5 hours in nitrogen gas of 100%.

On the other hand, when the thermal duration treatment is carried out by heating under the oxidizing atmosphere, the transition metal A is supported on the ceria-zirconia particles in different states according to the kind of the transition metal A.

For example, in the case where the transition metal A is Mn, when the thermal duration treatment is carried out by heating under the oxidizing atmosphere, Cu and Mn are turned into a non-stoichiometry spinel ($Cu_{1.5}Mn_{1.5}O_4$) state and are then supported on the ceria-zirconia particles; in the case where the transition metal A is Fe, Cu and Fe are turned into a spinel-type oxide ($CuFe_2O_4$) state and are then supported on the ceria-zirconia particles; and in the case where the transition metal A is Ni or Ag, Cu and Ni or Ag are supported on the ceria-zirconia particles in a state of each oxide ($CuO$—$NiO$ or $CuO$—$Ag_2O$).

However, in any cases, excessive quantities of Cu and the transition metal A exist in the state of each oxide.

With the respect to the content rate (that is, supported amount) of the transition metal consisting of at least one of Cu, Cr, Fe, Mn, Co, Ni, and Ag, the content rate of the transition metal is preferably 0.05 to 20 mass %, more preferably 0.10 mass % or more or 15 mass % or less, and most preferably 0.15 mass % or more or 10 mass % or less, as obtained by the following Formula (1).

Content rate of transition metal={amount of transition metal/(amount of ceria-zirconia particles+amount of transition metal)}×100     (1)

The content rate (that is, supported amount) of Cu obtained by the following Formula (2) is preferably 0.05 to 20 mass %, more preferably 0.10 mass % or more or 15 mass % or less, and most preferably 0.15 mass % or more or 10 mass % or less.

Content rate of Cu={amount of Cu/(amount of ceria-zirconia particles+amount of Cu+amount of transition metal A)}×100     (2)

The content rate (that is, supported amount) of the transition metal A obtained by the following Formula (3) is preferably 0.05 to 20 mass %, more preferably 0.1 mass % or more or 10 mass % or less, and most preferably 0.2 mass % or more or 5 mass % or less.

Content rate of transition metal A={amount of transition metal A/(amount of ceria-zirconia particles+amount of Cu+amount of transition metal A)}×100     (3)

Further, in a case where two or more transition metals are supported on the ceria-zirconia particles, a molar ratio of the transition metal having the first highest content of these transition metals to the transition metal having the second highest content is preferably 5:95 to 95:5, more preferably 10:90 to 90:10, and most preferably 2:8 to 8:2.

Moreover, the present catalyst particles may contain catalytic activity components, for example, noble metals different from Cu, Cr, Fe, Mn, Co, Ni, and Ag. When the present catalyst particles contain the noble metals, it is expected that oxidation activity of CO and HC is further improved.

Examples of the noble metals may include metals such as platinum, rhodium, or palladium.

(Stabilizer and Other Components)

The present catalyst particles may contain a stabilizer. Examples of the stabilizer may include an alkaline-earth metal or an alkaline metal. Preferably, the stabilizer can be selected one or two or more of metals selected from a group consisting of magnesium, barium, calcium, and strontium, and more preferably, the stabilizer can be selected one or two or more of metals selected from a group consisting of strontium and barium.

(Other Components Capable of being Contained in Present Catalyst Composition)

The present catalyst composition may contain other components different from the present catalyst particles. For example, the present catalyst composition may contain catalyst particles, in which the catalytic activity component such as the noble metal is supported on inorganic porous particles, OSC material particles and the like.

However, the present catalyst particles are preferably occupied in the present catalyst composition with at least 50 mass % or more, more preferably 70 mass % or more, and most preferably 90 mass % or more (including 100 mass %) of a total amount of the present catalyst particles and other catalyst particles.

Examples of the inorganic porous particles constituting the catalyst particles may include a porous body of the compound selected from a group consisting of silica, ceria, ceria-zirconia, alumina, or titania and more specifically a porous body consisting of the compound selected from alumina, silica, silica-alumina, alumino-silicates, alumina-zirconia, alumina-chromia, and alumina-ceria.

Examples of the noble metals constituting the catalyst particles may include metals such as platinum, rhodium, or palladium.

The OSC material particles may be particles consisting of materials having an oxygen storage capacity (OSC). For example, the OSC material particles may include cerium compound particles, zirconium compound particles, and ceria-zirconia particles.

(Specific Surface Area of Present Catalyst Composition)

A specific surface area of the present catalyst composition is not particularly limited. As a guideline, the specific surface area of the present catalyst composition is preferably 20 to 200 m$^2$/g and more preferably 30 m$^2$/g or more or 160 m$^2$/g or less, as a BET specific surface area.

(D50 of Present Catalyst Composition)

D50 of the present catalyst composition, that is, D50 by a volume standard particle size distribution obtained by measuring through a laser diffraction/scattering type particle size distribution measurement method is not particularly limited. As a guideline, D50 of the ceria-zirconia particles is preferably 1 μm to 50 μm, more preferably 2 μm or more or 30 μm or less, and most preferably 3 μm or more or 20 μm or less.

(Production Method of Present Catalyst Composition)

A slurry is obtained by mixing and stirring a ceria-zirconia particle powder, a compound of the transition metal including at least one of Cu, Cr, Fe, Mn, Co, Ni, and Ag, water, and other raw materials as needed with each other, and then the present catalyst composition can be obtained by drying the obtained slurry.

<Present Catalyst>

Next, an exhaust gas purifying catalyst (hereinafter, referred to as a "present catalyst") will be described, which can be prepared using the present catalyst composition.

The catalyst can be prepared by supporting the present catalyst composition on a honeycomb substrate.

In addition, the catalyst can be prepared by forming the present catalyst composition in a pellet shape.

As a specific configuration example of the present catalyst, for example, the present catalyst may include a catalyst provided with a catalyst layer which is formed through processes of preparing a slurry by mixing the present catalyst composition with water and other components, stirring the mixed present catalyst composition using a ball mill, and applying the slurry on a substrate by a wash coat.

In addition, another example of the present catalyst may include a catalyst provided with a catalyst layer which is formed on the surface of the substrate through processes of preparing a slurry by mixing the present catalyst composition with water and other components and stirring the mixed present catalyst composition using the ball mill, immersing the substrate into the slurry, and then pulling up the immersed substrate to fire it.

However, the method of producing the present catalyst can employ all of the known methods, and is not limited to the above examples.

(Substrate)

Examples of the substrate material used in the present catalyst may include refractory materials such as ceramics and metal materials.

Examples of the ceramic substrate material may include a refractory ceramic material, for example, cordierite, cordierite-alpha alumina, silicon nitride, zircon mullite, spodumene, alumina-silica magnesia, zircon silicate, sillimanite, magnesium silicate, zircon, petalite, alpha alumina, alumino-silicates, and the like.

Examples of the metal substrate material may include a refractory metal, for example, other suitable corrosion-resistant alloys based on stainless steel or iron.

The shape of the substrate may include a honeycomb shape, a pellet shape, or a spherical shape.

The honeycomb material may mainly use, for example, a cordierite material such as the ceramics. In addition, the honeycomb material may use the honeycomb formed of a metal material such as ferritic stainless steel.

In a case of using the substrate of the honeycomb shape, for example, it is possible to use a monolithic substrate which has a plurality of minute gas flow passages, that is, channels parallel to each other inside the substrate so that fluid flows through the inside of the substrate. At this time, catalyst compositions may be coated on the inner wall surface of each channel of the monolithic substrate by the wash coat to form the catalyst layer.

(Catalyst Layer)

The catalyst layer may be stacked with one or two or more in a vertical direction, and another catalyst layer may be formed in a flowing direction.

(Other Components)

The catalyst may contain known additive components such as a binder component.

Examples of the binder component may include an inorganic binder, for example an aqueous solution such as alumina sol, silica sol, or zirconia sol. These can take a type of an inorganic oxide by firing.

<Explanation of Expressions>

In this specification, when the expression "X to Y" (X and Y are arbitrary numbers) is used, unless otherwise explicitly mentioned, the meaning of "X or greater but Y or lower" is included and at the same time the meaning of "preferably greater than X" or "preferably less than Y" is included.

In addition, the expression "X or greater" (X is arbitrary number) or "Y or less" (Y is any number) includes the intention of "greater than X is desirable" or "less than Y is desirable".

EXAMPLES

Hereinafter, the invention will be described in detail based on following Examples and Comparative Examples.

Example 1

Slurry "A", that is, a catalyst composition "A" in which Cu oxide and Mn oxide were supported on ceria-zirconia particles was obtained by mixing 89.3 parts by mass of ceria-zirconia particle powder (indicated by "CZ" in Table 2. Ceria 50 wt %, zirconia 50 wt %, D50=15.6 μm, and specific surface area 40.8 m$^2$/g), 2.35 parts by mass of copper acetate monohydrate in terms of Cu metal, 2.35 parts by mass of manganese nitrate hexahydrate in terms of Mn metal, 3 parts by mass of activated alumina, 3 parts by mass of alumina sol, and 130 parts by mass of water with each other using a ball mill.

A cordierite honeycomb substrate of Φ 25.4 mm×L 30 mm-400 cells was immersed and pulled in/from the slurry "A", excessive slurry stuck on the honeycomb substrate was blown off. Then the honeycomb substrate was dried and fired at 950° C. for one hour to form a coat layer, and thus an exhaust gas purifying catalyst (sample) was obtained. The amount of coat layer was 110 g per 1 L of the honeycomb substrate.

Example 2

A catalyst composition and an exhaust gas purifying catalyst (sample) were obtained by the same as in Example 1 except that the ceria-zirconia particle powder used in Example 1 was changed to a ceria-zirconia particle powder (ceria rich: ceria 60 wt %, zirconia 40 wt %, D50=13.7 μm, specific surface area 30.5 m$^2$/g).

Example 3

A catalyst composition and an exhaust gas purifying catalyst (sample) were obtained by the same as in Example 1 except that the ceria-zirconia particle powder used in Example 1 was changed to a ceria-zirconia particle powder (zirconia rich: ceria 20 wt %, zirconia 80 wt %, D50=14.8 μm, specific surface area 35.8 m$^2$/g).

Example 4

A catalyst composition and an exhaust gas purifying catalyst (sample) were obtained by the same as in Example 1 except that the ceria-zirconia particle powder used in Example 1 was changed to a ceria-zirconia particle powder (ceria 40 wt %, zirconia 50 wt %, La$_2$O$_3$: 5 wt %, Nd$_2$O$_3$: 5 wt %, D50=14.3 μm, specific surface area 37.2 m$^2$/g).

Example 5

A catalyst composition and an exhaust gas purifying catalyst (sample) were obtained by the same as in Example 1 except that the manganese nitrate hexahydrate was not blended and the amount of the copper acetate monohydrate was changed to 4.7 parts by mass in terms of the Cu metal with respect to the amount of the copper acetate monohydrate and the manganese nitrate hexahydrate in Example 1.

Example 6

A catalyst composition and an exhaust gas purifying catalyst (sample) were obtained by the same as in Example 1 except that the amount of the copper acetate monohydrate was changed to 3.76 parts by mass in terms of the Cu metal and the amount of the manganese nitrate hexahydrate was changed to 0.94 parts by mass in terms of the Mn metal with respect to the amount of the copper acetate monohydrate and the manganese nitrate hexahydrate in Example 1.

Example 7

A catalyst composition and an exhaust gas purifying catalyst (sample) were obtained by the same as in Example 1 except that the amount of the copper acetate monohydrate was changed to 0.94 parts by mass in terms of the Cu metal and the amount of the manganese nitrate hexahydrate was changed to 3.76 parts by mass in terms of the Mn metal with respect to the amount of the copper acetate monohydrate and the manganese nitrate hexahydrate in Example 1.

Example 8

A catalyst composition and an exhaust gas purifying catalyst (sample) were obtained by the same as in Example 1 except that the copper acetate monohydrate was not blended and the amount of the manganese nitrate hexahydrate was changed to 4.7 parts by mass in terms of the Mn metal with respect to the amount of the copper acetate monohydrate and the manganese nitrate hexahydrate in Example 1.

Comparative Example 1

A catalyst composition and an exhaust gas purifying catalyst (sample) were obtained by the same as in Example 1 except for blending alumina particles (D50=10.3 μm, specific surface area 65.2 m²/g) instead of 89.3 parts by mass of the ceria-zirconia particle powder in Example 1.

Comparative Example 2

A catalyst composition and an exhaust gas purifying catalyst (sample) were obtained by the same as in Example 1 except for blending silica-alumina particles (D50=10.5 μm, specific surface area 103.2 m²/g) instead of 89.3 parts by mass of the ceria-zirconia particle powder in Example 1.

Comparative Example 3

A catalyst composition and an exhaust gas purifying catalyst (sample) were obtained by the same as in Example 1 except for blending zirconia particles (D50=10.8 μm, specific surface area 55.4 m²/g) instead of 89.3 parts by mass of the ceria-zirconia particle powder in Example 1.

<XRD Measurement>

An XRD measurement was performed on the ceria-zirconia particles in the exhaust gas purifying catalyst (sample) after the thermal duration obtained by Examples 1 to 9. As illustrated in FIG. 1, it was possible to find common features in that a peak (2θ=around 28 to 32°) arising from (111) plane was divided into two peak tops in an XRD pattern. It was presumed that there was not a uniform solid solution of the ceria and zirconia which uniformly existed as a solid solution but a ceria-zirconia separation solid solution in which a peak arising from (111) plane having different matrix phase and composition was shifted to another position and another solid solution was partially separated and existed so that the peak tops were divided into two.

<Test of Exhaust Gas Purification Performance>

The exhaust gas purifying catalysts (samples) obtained by Examples 1 to 8 and Comparative Examples 1 to 3 were subjected to a thermal duration treatment at 900° C. for one hour under an air atmosphere.

After thermal duration treatment, the exhaust gas purifying catalysts (samples) were separately filled in each of evaluation apparatuses. Then, a purification rate of CO and HC was continuously measured by flowing an exhaust model gas having compositions indicated in Table 1 into each of evaluation apparatuses at a space velocity of 24000/h and by also raising a temperature up to 600° C. at a temperature rise rate of 20° C./min. A temperature (T50) (° C.) at which the model gas was purified by 50% was indicated in Table 2.

TABLE 1

| AF | CO | $O_2$ | NO | $C_3H_6$ | $CO_2$ | $H_2O$ | $N_2$ |
|---|---|---|---|---|---|---|---|
| 28 | 1% | 0.5% | 200 ppm | 500 ppmc | 10% | 10% | bal. |

TABLE 2

| | | Molar ratio | | T50 (° C.) | |
|---|---|---|---|---|---|
| | Carrier | Cu | Mn | CO | HC |
| Example 1 | CZ | 5 | 5 | 269 | 438 |
| Example 2 | CZ | 5 | 5 | 263 | 492 |
| Example 3 | CZ | 5 | 5 | 289 | 450 |
| Example 4 | CZ | 5 | 5 | 267 | 436 |
| Comparative Example 1 | $Al_2O_3$ | 5 | 5 | 470 | 525 |
| Comparative Example 2 | $Al_2O_3/SiO_2$ | 5 | 5 | — | 601 |
| Comparative Example 3 | $ZrO_2$ | 5 | 5 | 411 | 524 |
| Example 5 | CZ | 10 | 0 | 244 | 441 |
| Example 6 | CZ | 8 | 2 | 262 | 446 |
| Example 7 | CZ | 2 | 8 | 324 | 432 |
| Example 8 | CZ | 0 | 10 | 400 | 423 |

As is apparent from data indicated in Table 2, in T50 (this is a temperature at which the exhaust gas is purified by 50%, and the exhaust gas purifying catalyst is regarded as excellent in a low-temperature activity as the temperature is low) with respect to CO and HC, it was proved that the exhaust gas purifying catalysts (samples) obtained by Examples 1 to 8 were superior to the exhaust gas purifying catalysts (samples) obtained by Comparative Examples 1 to 3 and the exhaust gas purifying catalysts obtained by Examples 1 to 7 were high in the low-temperature activity and were excellent in heat resistance to obtain stable exhaust gas purification performance. Particularly, in Comparative Example 2, the oxidation activity of CO was so low activity that the purification rate could not reach 50%.

In addition, when Examples 1 to 7 were compared with each other, it was found that the oxidation activity of CO was improved in accordance with increasing a composition ratio of Cu.

Example 9

Slurry was obtained by adding 99.6 parts by mass of ceria-zirconia particle powder (indicated by "CZ" in Table 2. Ceria 50 wt %, zirconia 50 wt %, D50=15.6 μm, and specific surface area 40.8 m²/g), 0.2 parts by mass of copper acetate monohydrate in terms of Cu metal, 0.2 parts by mass of manganese nitrate hexahydrate in terms of Mn metal, and an appropriate amount of ion exchange water. After being stirred, the slurry was dried and fired at 950° C. for one hour under an air atmosphere.

Example 10

A catalyst composition and an exhaust gas purifying catalyst (sample) were obtained by the same as in Example 9 except that 95.0 parts by mass of ceria-zirconia particle powder (indicated by "CZ" in Table 2. Ceria 50 wt %, zirconia 50 wt %, D50=15.6 μm, and specific surface area 40.8 m²/g), 2.5 parts by mass of copper acetate monohydrate in terms of Cu metal, and 2.5 parts by mass of manganese nitrate hexahydrate in terms of Mn metal were mixed with each other.

Comparative Example 4

A catalyst composition and an exhaust gas purifying catalyst (sample) were obtained by the same as in Example 9 except that the ceria-zirconia particle powder was changed to ceria ($CeO_2$, D50=8.2 μm, specific surface area 50.6 m²/g) in Example 9.

Comparative Example 5

A catalyst composition and an exhaust gas purifying catalyst (sample) were obtained by the same as in Example 9 except that the ceria-zirconia particle powder was changed to zirconia ($ZrO_2$, D50=9.8 μm, specific surface area 40.7 m$^2$/g) in Example 9.

Comparative Example 6

A catalyst composition and an exhaust gas purifying catalyst (sample) were obtained by the same as in Example 10 except that the ceria-zirconia particle powder was changed to ceria ($CeO_2$, D50=8.2 μm, specific surface area 50.6 m$^2$/g) in Example 10.

Comparative Example 7

A catalyst composition and an exhaust gas purifying catalyst (sample) were obtained by the same as in Example 10 except that the ceria-zirconia particle powder was changed to zirconia ($ZrO_2$, D50=9.8 μm, specific surface area 40.7 m$^2$/g) in Example 10.

<Test of Exhaust Gas Purification Performance>

The exhaust gas purifying catalysts (samples) obtained by Examples 9 and 10 and Comparative Examples 4 to 7 were subjected to the thermal duration treatment at 950° C. for 4 hours under a nitrogen atmosphere.

After thermal duration treatment, the exhaust gas purifying catalysts (samples) obtained by Examples 9 and 10 and Comparative Examples 4 to 7 were separately filled in each of the evaluation apparatuses. Then, the purification performance of a simulation exhaust gas was measured using a fixed bed flow type reactor. Specifically, a catalyst powder of 0.1 g was set in a reaction tube, and then the simulation exhaust gas was introduced into the catalyst powder at the following state, that is, 10° C./min, λ=48, air fuel ratio (A/F)=28, CO: 1000 ppm, $C_3H_6$: 500 ppmC, NO: 200 ppm, $O_2$: 0.5%, $CO_2$: 10%, $H_2O$: 10%, $N_2$: balance, total flow rate 1000 cc/min. A pre-treatment was carried out by holding for 10 minutes after raising a temperature up to 750° C. at the temperature rise rate of 10° C./min. Then, the purification performance of a simulation exhaust gas was measured by raising a temperature from 100° C. to 750° C. at the temperature rise rate of 10° C./min after once cooling.

Further, "A/F" of the air fuel ratio (A/F) stands for Air/Fuel and a numerical number which indicates a ratio of the fuel to the air.

Outlet gas components were measured using CO/NO analyzer ("PG240" manufactured by Horiba Ltd.) and HC analyzer ("VMF-1000F" manufactured by Shimadzu Co.).

A temperature (CO-T30) (° C.) at which CO was purified by 30% and a temperature (HC-T15) (° C.) at which HC was purified by 15% were indicated in Table 3.

TABLE 3

|  | Carrier | Cu, Mn supported amount (wt %) | CO-T30 (° C.) | HC-T15 (° C.) |
|---|---|---|---|---|
| Example 9 | CZ | 0.2 | 278.2 | 489.0 |
| Comparative Example 4 | CeO2 | 0.2 | 676.7 | 729.2 |
| Comparative Example 5 | ZrO2 | 0.2 | 336.4 | 510.1 |
| Example 10 | CZ | 2.5 | 344.0 | 531.3 |
| Comparative Example 6 | CeO2 | 2.5 | 685.7 | 730.3 |
| Comparative Example 7 | ZrO2 | 2.5 | 587.2 | 650.2 |

As indicated in Table 3, it has been found that as a carrier for supporting the transition metal, $CeO_2$—$ZrO_2$ solid solution is preferred, and the catalyst in which CZ phase is separated to have an interaction with the transition metal is more preferred as can be seen from the results of XRD.

The invention claimed is:

1. An exhaust gas purifying catalyst composition comprising ceria-zirconia particles with a feature in that a peak arising from (111) plane is divided into two peak tops in an XRD pattern, wherein the ceria-zirconia particles have a mass ratio of $CeO_2$ to $ZrO_2$ of 5:95 to 50:50,
   wherein a transition metal including at least one of Cu, Cr, Fe, Mn, Co, Ni, and Ag is supported on the ceria-zirconia particles wherein Cu and a transition metal A including Mn, Cu, and a transition metal including at least one of Cr, Fe, Co, Ni, and Ag are supported on the ceria-zirconia particles.

2. The exhaust gas purifying catalyst composition according to claim 1, wherein Cu and a transition metal A including Mn, Cu and a transition metal A including Cr, or Cu and a transition metal A including Fe are supported on the ceria-zirconia particles.

3. The exhaust gas purifying catalyst composition according to claim 1, wherein Cu and said transition metal A form composite oxides to be supported on the ceria-zirconia particles.

4. The exhaust gas purifying catalyst composition according to claim 1, wherein said transition metal A is contained at a rate of 0.05 to 20 mass % relative to a content of Cu, as determined from the following Formula-(3), Content rate of transition metal A={amount of transition metal A/(amount of ceria-zirconia particles+amount of Cu+amount of transition metal A)}×100.

5. An exhaust gas purifying catalyst in which the exhaust gas purifying catalyst composition according to claim 1 is supported on a honeycomb substrate.

6. An exhaust gas purifying catalyst in which the exhaust gas purifying catalyst composition according to claim 1 is formed in a pellet shape.

7. The exhaust gas purifying catalyst composition according to claim 2, wherein Cu and said transition metal A including Mn, Cu and said transition metal A including Cr, or Cu and said transition metal A including Fe are supported on the ceria-zirconia particles.

8. The exhaust gas purifying catalyst composition according to claim 2, wherein Cu and said transition metal A form composite oxides to be supported on the ceria-zirconia particles.

9. The exhaust gas purifying catalyst composition according to claim 2, wherein said transition metal A is contained at a rate of 0.05 to 20 mass % relative to a content of Cu, as determined from the following Formula-(3), Content rate of transition metal A={amount of transition metal A/(amount of ceria-zirconia particles+amount of Cu+amount of transition metal A)}×100.

10. The exhaust gas purifying catalyst composition according to claim 3, wherein said transition metal A is contained at a rate of 0.05 to 20 mass % relative to a content of Cu, as determined from the following Formula-(3), Content rate of transition metal A={amount of transition metal A/(amount of ceria-zirconia particles+amount of Cu+amount of transition metal A)}×100.

(5)

\* \* \* \* \*

UNITED STATES PATENT AND TRADEMARK OFFICE
CERTIFICATE OF CORRECTION

PATENT NO. : 9,533,290 B2  
APPLICATION NO. : 14/255127  
DATED : January 3, 2017  
INVENTOR(S) : Yuki Nagao et al.

Page 1 of 1

It is certified that error appears in the above-identified patent and that said Letters Patent is hereby corrected as shown below:

In the Claims

Column 12, Line 52, Claim 7, delete "2," and insert -- 1, --

Signed and Sealed this
Fourteenth Day of March, 2017

Michelle K. Lee
*Director of the United States Patent and Trademark Office*